United States Patent
Festa et al.

(10) Patent No.: US 10,541,575 B2
(45) Date of Patent: Jan. 21, 2020

(54) ROTOR FOR AN ELECTRIC ROTATING MACHINE

(71) Applicant: SIEMENS AKTIENGESELLSCHAFT, München (DE)

(72) Inventors: Marco Festa, Falkensee (DE); Matthias Centner, Berlin (DE); Ilja Sabelfeld, Berlin (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 16/317,385

(22) PCT Filed: Jun. 19, 2017

(86) PCT No.: PCT/EP2017/064909
§ 371 (c)(1),
(2) Date: Jan. 11, 2019

(87) PCT Pub. No.: WO2018/010912
PCT Pub. Date: Jan. 18, 2018

(65) Prior Publication Data
US 2019/0319502 A1     Oct. 17, 2019

(30) Foreign Application Priority Data
Jul. 14, 2016   (EP) .................... 16179483

(51) Int. Cl.
*H02K 1/24*     (2006.01)
*H02K 1/22*     (2006.01)
(Continued)

(52) U.S. Cl.
CPC ........... *H02K 1/246* (2013.01); *H02K 15/022* (2013.01); *H02K 19/103* (2013.01)

(58) Field of Classification Search
CPC .. H02K 1/00; H02K 1/08; H02K 1/10; H02K 1/12; H02K 1/14; H02K 1/146;
(Continued)

(56) References Cited

U.S. PATENT DOCUMENTS 4,698,537 A * 10/1987 Byrne .................... H02K 1/246
                                                              310/168
5,949,172 A    9/1999 Katagiri
(Continued)

FOREIGN PATENT DOCUMENTS

DE       2116821 A1     11/1971
JP       S6172048 U     5/1986
(Continued)

OTHER PUBLICATIONS

International Search Report issued by the European Patent Office in International Application PCT/EP2017/064909.

*Primary Examiner* — Tran N Nguyen
(74) *Attorney, Agent, or Firm* — Henry M. Feiereisen LLC

(57) ABSTRACT

A rotor for an electric rotating machine, in particular a synchronous machine includes a shaft that can rotate about an axis of rotation, and at least one pole shoe. In order to improve vibration properties, the pole shoe includes a pole shoe body and a pole shoe sheet metal which rests on a radially outer surface of the pole shoe body.

21 Claims, 9 Drawing Sheets

(51) Int. Cl.
*H02K 15/02* (2006.01)
*H02K 19/10* (2006.01)

(58) Field of Classification Search
CPC .......... H02K 1/148; H02K 1/18; H02K 1/187;
H02K 1/24; H02K 1/246; H02K 1/26;
H02K 1/28; H02K 1/30; H02K 3/18
See application file for complete search history.

(56) References Cited

U.S. PATENT DOCUMENTS

| | | | | |
|---|---|---|---|---|
| 6,611,076 | B2* | 8/2003 | Lindbery | ............... H02K 1/165 |
| | | | | 310/214 |
| 2002/0149282 | A1* | 10/2002 | Heidrich | ................ H02K 1/148 |
| | | | | 310/216.064 |
| 2005/0253476 | A1* | 11/2005 | Zhong | ...................... H02K 1/08 |
| | | | | 310/216.064 |

FOREIGN PATENT DOCUMENTS

| JP | S5959033 A | 4/1989 |
|---|---|---|
| SU | 817866 A1 | 3/1981 |
| SU | 1399852 A1 | 5/1988 |

* cited by examiner

ROTOR FOR AN ELECTRIC ROTATING MACHINE

CROSS-REFERENCES TO RELATED APPLICATIONS

This application is the U.S. National Stage of International Application No. PCT/EP2017/064909, filed Jun. 19, 2017, which designated the United States and has been published as International Publication No. WO 2018/010912 and which claims the priority of European Patent Application, Serial No. 16179483.9, filed Jul. 14, 2016, pursuant to 35 U.S.C. 119(a)-(d).

BACKGROUND OF THE INVENTION

The invention relates to a rotor for an electric rotating machine, in particular a synchronous machine, comprising a shaft which can rotate about a rotation axis, and at least one pole shoe.

Furthermore, the invention relates to an electric rotating machine, in particular a synchronous machine, with such a rotor.

The invention further relates to a method for producing such a rotor.

Such a rotor is used, in particular, with direct-starting synchronous salient-pole machines with attached pole shoes. Attached pole shoes occur essentially in large-scale drives with a power output of at least 1 Megawatt.

A direct drive is occasionally an economical method for realizing a start-up on a network, wherein the synchronous machine is started up asynchronously and is put into synchronous operation close to the synchronous rotary speed. For an asynchronous start-up, the rotor must be configured so that the currents needed for the start-up can flow, wherein rotors with solid poles can use the conductivity of the pole surface.

In the case of the asynchronous start-up of a synchronous salient-pole machine, eddy currents are induced in the attached pole shoes, wherein in particular the surface of the pole shoes is severely heated by alternating magnetic fields, particularly due to eddy currents. In the case of large synchronous machines with a power output of at least 1 Megawatt, it is also required that they can start up under a defined countermoment. In the case of such a countermoment, temperatures of several hundred degrees Celsius can arise at the surfaces of the pole shoes.

Evoked by a high temperature difference between a pole shoe and a pole shank, large shear forces can occur at a parting line between the pole shoe and the pole shank. Such a great temperature difference between an underside and an upper side of the pole shoe leads to a deformation, in particular a bowing of the pole shoe. Since the deformation is caused by temperature differences brought about by alternating electromagnetic fields or eddy currents, this is known as an electromagnetically induced thermal deformation. By means of this type of electromagnetically induced thermal deformation, the pole shoe and the pole shank can move relative to one another. The mass displacement of the pole shoe associated with the deformation and displacement have a negative effect on the momentum status of the rotor and thus on the oscillation behavior.

The patent document U.S. Pat. No. 5,949,172 A discloses a motor with a driving coil which is wound round a salient pole. An opening width of an armature core is kept sufficiently large in order to be able to wind the driving coil properly and easily. Following the winding of the driving coil, a magnetic flux collecting plate is mounted on an outer peripheral surface of an arc-shaped region of the salient pole. During the assembly process, two claw-shaped positioning grip portions formed in the magnetic flux collecting plate are fitted into grooves (119) which are each arranged in the upper and lower end faces of the armature core.

The published application JP S59 59033 A discloses a pole for a salient pole rotor, wherein a coil is wound onto a pole body of the pole, which stands out in one piece from a rotary shaft. A pole shoe is fastened onto the pole body with a bolt in order to carry the coil, wherein the head of the bolt is sunk into a bore of the pole shoe. In order to eliminate local temperature increases, the opening of the bore of the pole shoe is closed with a magnetic plate which is configured substantially smooth like the surface of the pole shoe.

The published application DE 21 16 821 A1 discloses a solid pole of an electric motor which starts in an asynchronous region, which has at least one closed cooling circuit of which at least a part is situated in a peripheral pole region and another part is situated in a region of a pole foot. The cooling circuit contains a heat transporting fluid which forms a natural circulating flow during the start-up of the motor under the effect of influencing variables such as acceleration, speed and heating.

SUMMARY OF THE INVENTION

It is an object of the invention to provide a rotor for an electric rotating machine which, as compared with the prior art has, given local heating of the pole shoe, an improved oscillation behavior.

The object is achieved according to the invention by means of a rotor for an electric rotating machine, in particular a synchronous machine, comprising a shaft which can rotate about a rotation axis, and at least one pole shoe, wherein the pole shoe has a pole shoe body and a pole shoe metal sheet, wherein the pole shoe metal sheet lies on a radially outer surface of the pole shoe body, wherein the pole shoe metal sheet is connected at a plurality of connection points to the pole shoe body and wherein the pole shoe metal sheet is configured to be flexible between the connection points at least in the axial direction by curvatures and/or grooves.

The object is further achieved according to the invention by means of a rotor for an electric rotating machine, in particular a synchronous machine, comprising a shaft which can rotate about a rotation axis, and at least one pole shoe, wherein the pole shoe has a pole shoe body and a pole shoe metal sheet, wherein the pole shoe metal sheet lies on a radially outer surface of the pole shoe body, wherein the pole shoe metal sheet comprises at least two layered individual metal sheets.

The object is further achieved through an electric rotating machine, in particular a synchronous machine with such a rotor.

The invention further relates to a method for producing such a rotor.

The advantages and preferred embodiments disclosed below in relation to the rotor can be applied accordingly to the electric rotating machine and the production method.

The invention is based upon the concept of improving the oscillation behavior of the rotor in that a pole shoe metal sheet is fastened to the radially outer surface of the pole shoe body. The radially outer surface of the pole shoe body is the surface which, during operation of the rotor in an electric rotating machine, adjoins a gap between the rotor and a stator. For example, eddy currents occurring during an asynchronous start-up flow at least to a large extent in the pole shoe metal sheet which heats up and expands due to the eddy currents. The expansion merely brings about an elastic deformation of the pole shoe metal sheet. The radially outer surface of the pole shoe body hardly heats up, so that no significant electromagnetically induced thermal deformation of the pole shoe body occurs.

The pole shoe metal sheet is connected to the pole shoe body at a plurality of connection points. By means of such a punctiform connection, the pole shoe metal sheet is connected mechanically and electrically conductively to the pole shoe body. By means of the punctiform connection, a temperature equalization between the pole shoe metal sheet and the pole shoe body is made more difficult.

The pole shoe metal sheet is configured to be flexible between the connection points at least in the axial direction. A flexible configuration should be understood to mean that the pole shoe metal sheet is arranged movably, slideably and/or deformably on the surface of the pole shoe. As a result of this flexible configuration, the pole shoe metal sheet can deform, in particular between the connection points, independently of the pole shoe body, for example, due to eddy current-induced heating.

By means of curvatures and/or grooves on the pole shoe metal sheet, the mechanical and electrical properties of the pole shoe metal sheet are influenced in a targeted manner. By means of curvatures, the pole shoe metal sheet is more easily and more specifically deformable, for example, by means of a heating due to eddy currents, in particular in the axial direction.

Through the use of at least two individual metal sheets arranged layered over one another, overall thicker sheet metal layers can be realized, while a high degree of flexibility is maintained.

In a preferred embodiment, the pole shoe metal sheet is connected to the pole shoe body at a plurality of connection points by means of connecting elements and/or by means of a firmly bonded connection. Connecting elements, in particular releasable connecting elements are, for example, screws. A firmly bonded connection is, in particular, a weld connection. By means of such a punctiform connection, the pole shoe metal sheet is connected mechanically and electrically conductively to the pole shoe body. By means of the punctiform connection, a temperature equalization between the pole shoe metal sheet and the pole shoe body is made more difficult.

In a preferred embodiment, the pole shoe metal sheet has a profiling. A profiling should be understood, in relation to a reference plane, as being elevations and/or depressions, in particular curvatures and/or grooves on the pole shoe metal sheet and/or cut-outs, in particular slits, in the pole shoe metal sheet. By means of such profiling, the mechanical and electrical properties of the pole shoe metal sheet can be influenced in a targeted manner.

Advantageously, the profiling is configured curved at least in sections. A curvature should be understood, in relation to a reference plane, as being an elevation or a depression, wherein in particular the length or the width of the curvature is significantly greater than the depth of the curvature. By means of such curvatures, the pole shoe metal sheet is more easily and more specifically deformable.

Preferably, the profiling has slits and/or holes, wherein the slits extend at least in the axial direction. Holes are circular, oval, square or rectangular cut-outs in the pole shoe metal sheet. Slits are elongate straight or curved cut-outs in the pole shoe metal sheet. Holes and slits are made, for example, by stamping, laser cutting, milling, boring or water jet cutting. By means of such holes or slits, the mean conductivity of the pole shoe metal sheet is reduced, which can be used for influencing the start-up torque. Furthermore, by means of such holes or slits, eddy currents can at least be reduced.

Preferably, the profiling has grooves. A groove should be understood, in relation to a reference plane, as being an elevation or a depression, wherein in particular, the width of the groove is smaller than the depth of the groove. Such a groove stiffens the sheet metal in the direction of the path of the groove. In addition, the pole shoe metal sheet is more easily and more specifically deformable, in particular perpendicularly to the course of the groove.

In a particularly advantageous manner, the pole shoe metal sheet lies full-surface on the radially outer surface of the pole shoe body. In particular, the pole shoe metal sheet is substantially adapted to the contour of the radially outer surface of the pole shoe body. By this means, in an optimum manner, eddy currents on the pole shoe body are at least reduced.

Preferably, the pole shoe metal sheet is formed from a soft magnetic material. In particular, the pole shoe metal sheet consists of a steel, of iron, nickel or cobalt. Through the use of a soft magnetic material, the effective width of the gap between the rotor and the stator, as compared with the configuration without the pole shoe metal sheet, remains unchanged, in particular if the radial height of the pole shoe body is reduced by the metal sheet thickness. Therefore, through the use of a soft magnetic material for the pole shoe metal sheet, an optimum output and efficiency of the electric rotating machine is ensured.

Suitably, the pole shoe metal sheet has a thickness in the range of 1 mm to 10 mm. In particular, a few millimeters suffice so that a larger proportion of the thermal losses takes place in the pole shoe metal sheet. Experience has shown that such a thickness of the starting plate represents the optimum of effectiveness and technical feasibility.

BRIEF DESCRIPTION OF THE DRAWING

The invention will now be described and explained in greater detail making reference to the exemplary embodiments illustrated in the drawings, in which.

DETAILED DESCRIPTION OF PREFERRED EMBODIMENTS

The same reference signs have the same meaning in the different figures.

Figure 1:
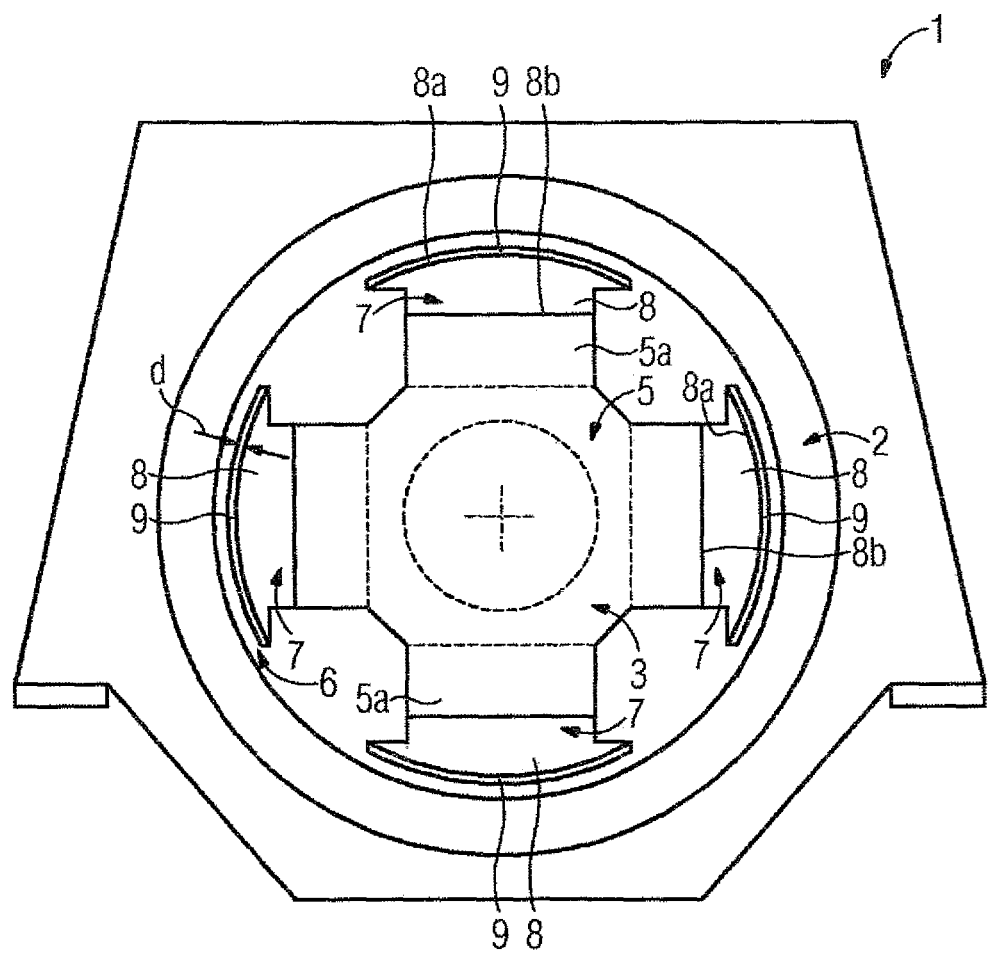
FIG. 1 shows a cross-section of an electric rotating machine.

FIG. 1 shows a cross-section of an electric rotating machine 1 which is configured as a direct-starting synchronous machine 1a. The direct-starting synchronous machine 1a is operable with a power output of at least 1 Megawatt. It has a stator 2 and a rotor 3 rotatable about a rotation axis 4. The stator 2 is arranged round the rotor 3, wherein a gap 6 is arranged between the stator 2 and the rotor 3. The gap 6 is configured as an air gap, although there can also be other fluids in the gap 6 between the stator 2 and the rotor 3. The coils of the stator 2 and of the rotor 3 are not shown for reasons of clarity. The synchronous machine 1a can also be configured without coils as a synchronous reluctance machine.

The rotor 3 of the direct-starting synchronous machine 1a has a shaft 5 with, by way of example, four orthogonally arranged pole shanks 5a, wherein the pole shanks 5a are each provided with pole shoes 7. The shaft 5 consists at least mainly of a soft magnetic steel configured as a solid material, in particular a heat-treatable steel. The pole shoes 7 are screwed with the aid of pole shoe screws 14 (see FIG. 2) onto the shaft 5. For the sake of clarity, the pole shoe screws 14 are not shown in FIG. 1.

Each pole shoe 7 comprises a pole shoe body 8 which has a radially outer surface 8a and a radially inner surface 8b and a pole shoe metal sheet 9. The radially inner surface 8b of the pole shoe body 8 lies on a pole shank 5a of the shaft 5. The pole shoe metal sheet 9 which directly adjoins the gap 6 lies on the radially outer surface 8a. The pole shoe body 8 consists at least mainly of a soft magnetic steel configured as a solid material, in particular a heat-treatable steel. The pole shoe metal sheet 9 has a thickness d in the region of 1 mm to 10 mm and consists of a soft magnetic material, in particular a soft magnetic steel. The pole shoe metal sheet 9 can consist of different materials in order, in particular, to influence the conductivity in a targeted manner locally. Furthermore, the pole shoe metal sheet 9 can also comprise a plurality of layered individual metal sheets which consist of the same or different materials. On use of a plurality of metal sheets arranged layered over one another, overall thicker sheet metal layers can be realized, while a high degree of flexibility is maintained.

Figure 2:
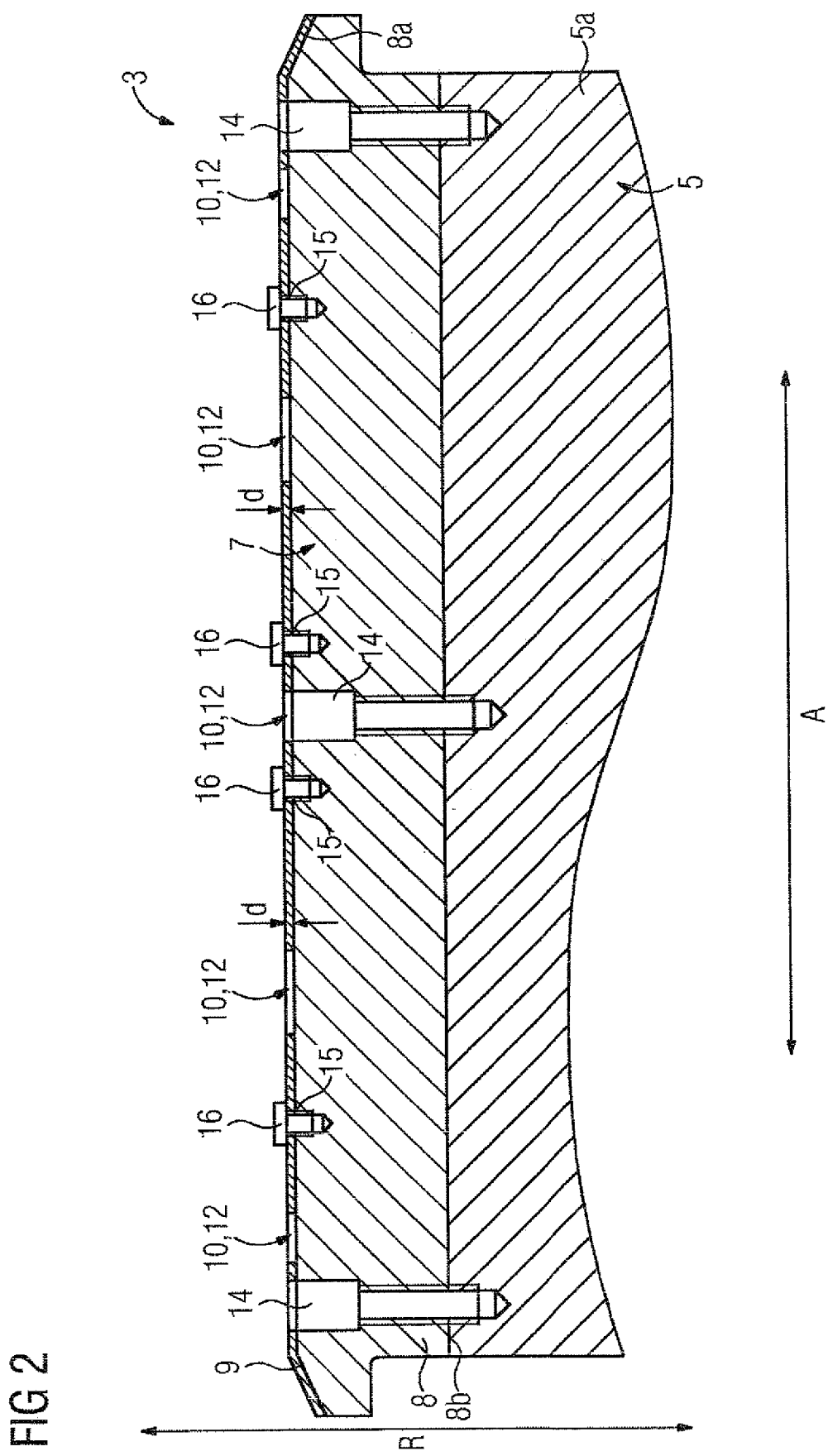
FIG. 2 shows an enlarged longitudinal section of a rotor in the region of a pole shoe with a first embodiment of a pole shoe metal sheet.

FIG. 2 shows an enlarged longitudinal section of a rotor 3 in the region of a pole shoe 7 with a first embodiment of a pole shoe metal sheet 9. The pole shoe body 8 of the pole shoe 7 lies on a pole shank 5a of the shaft 5 and is fastened with the pole shank 5a by means of a plurality of pole shoe screws 14. The pole shoe body 8 can also be connected to the pole shank 5a by a different means, for example, with the aid of a firmly bonded connection, in particular a weld connection. The pole shoe metal sheet 9 lies on the pole shoe body 8 and is connected thereto at a plurality of connection points 15 with the aid of connecting elements 16, in particular screws. The pole shoe metal sheet 9 can alternatively or additionally be connected directly via connecting elements 16 through the pole shoe body 8 to the pole shank 5a. In addition, the pole shoe metal sheet 9 can alternatively or additionally be connected at the connection points 15 by means of a firmly bonded connection 17, in particular a punctiform weld connection, to the pole shoe body 8.

The pole shoe metal sheet 9 has a profiling 10 in the form of slits 12 which extend, in particular, in the axial direction A between the connection points 15. At least a part of the slits 12 can also be configured as further cut-outs, in particular as holes. Slits 12 and bores are made, for example, by stamping, laser cutting, milling, boring or water jet cutting. A combination of these manufacturing methods is also the subject matter of the invention. By means of such slits 12 or bores, the mean conductivity of the pole shoe metal sheet 9 is changed, in particular locally reduced, which can be used for influencing the start-up torque. Furthermore, by means of such slits 12 or holes, the spread of eddy currents can at least be reduced.

Figure 3:
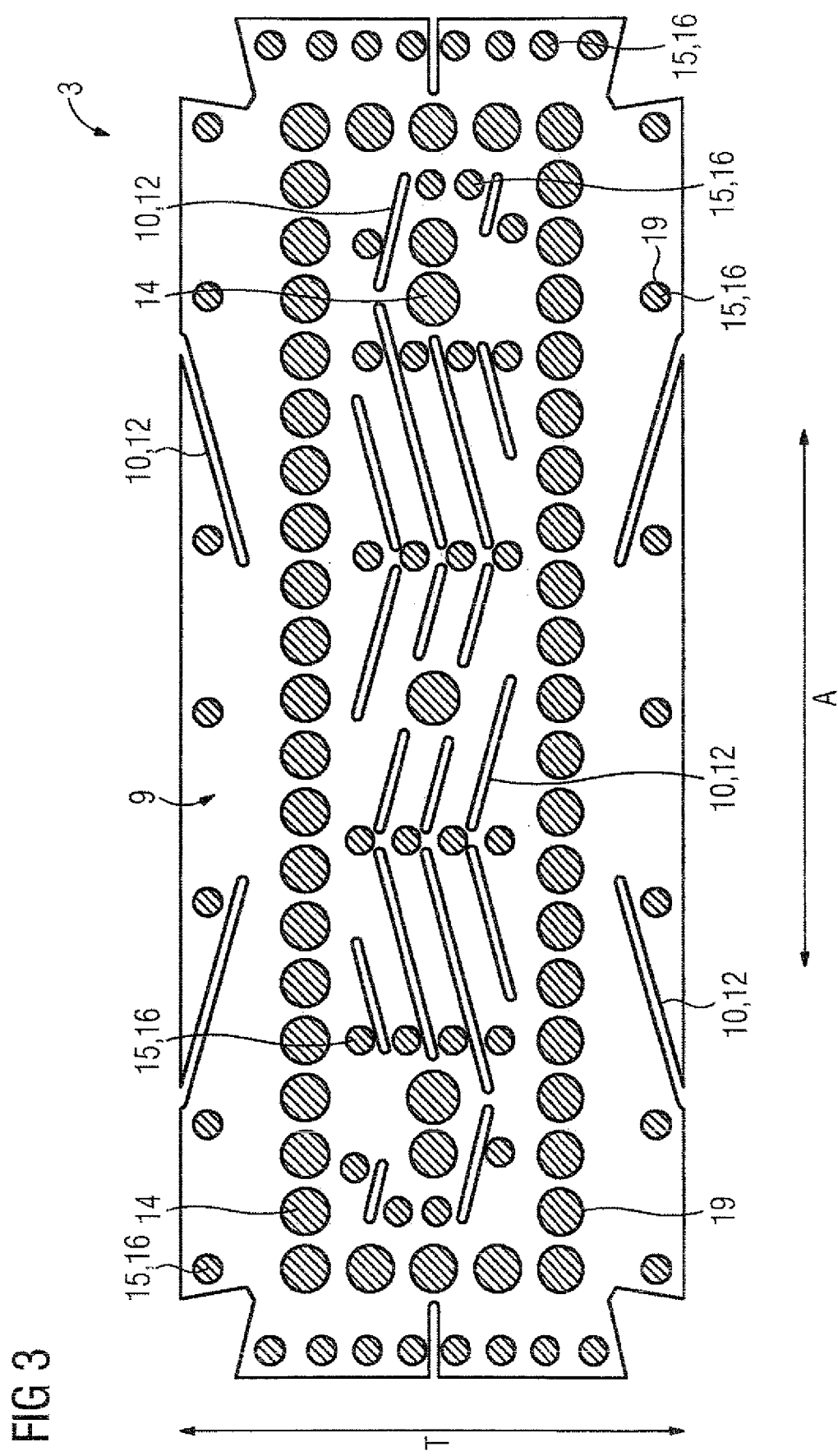
FIG. 3 shows a plan view of a first embodiment of a pole shoe metal sheet.

FIG. 3 shows a plan view of a first embodiment of a pole shoe metal sheet 9. The pole shoe metal sheet 9 is mounted on the rotor 3, wherein the rest of the rotor 3 is not shown for reasons of clarity. The contour of the pole shoe metal sheet 9 is adapted to the contour of the radially outer surface 8a of the pole shoe body 8 and the pole shoe metal sheet 9 lies full-surface on the pole shoe body 8 of the pole shoe 7. The pole shoe metal sheet 9 has, in particular circular, cut-outs 19 for pole shoe screws 16 for fastening the pole shoe body 8 to a pole shank 5a of the shaft 5. In addition, the pole shoe metal sheet 9 has, in particular circular, cut-outs 19 for connecting elements 16, which connect the pole shoe metal sheet 9 at a plurality of connection points 15 to the pole shoe body 8. Both the cut-outs 19 for the pole shoe screws 16 and also the cut-outs 19 for the connecting elements 16 are arranged on the pole shoe metal sheet 9 in the axial direction A and the tangential direction T. Furthermore, the pole shoe metal sheet 9 has a profiling 10 in the form of slits 12, wherein the slits 12 are configured straight and extend diagonally on the pole shoe metal sheet 9. The slits are arranged in the axial direction substantially between the connection points 15. As a result of such an arrangement of the slits 12, the pole shoe metal sheet 9 is more easily deformable between the connection points 15, in particular in the axial direction A and the tangential direction T.

Figure 4:
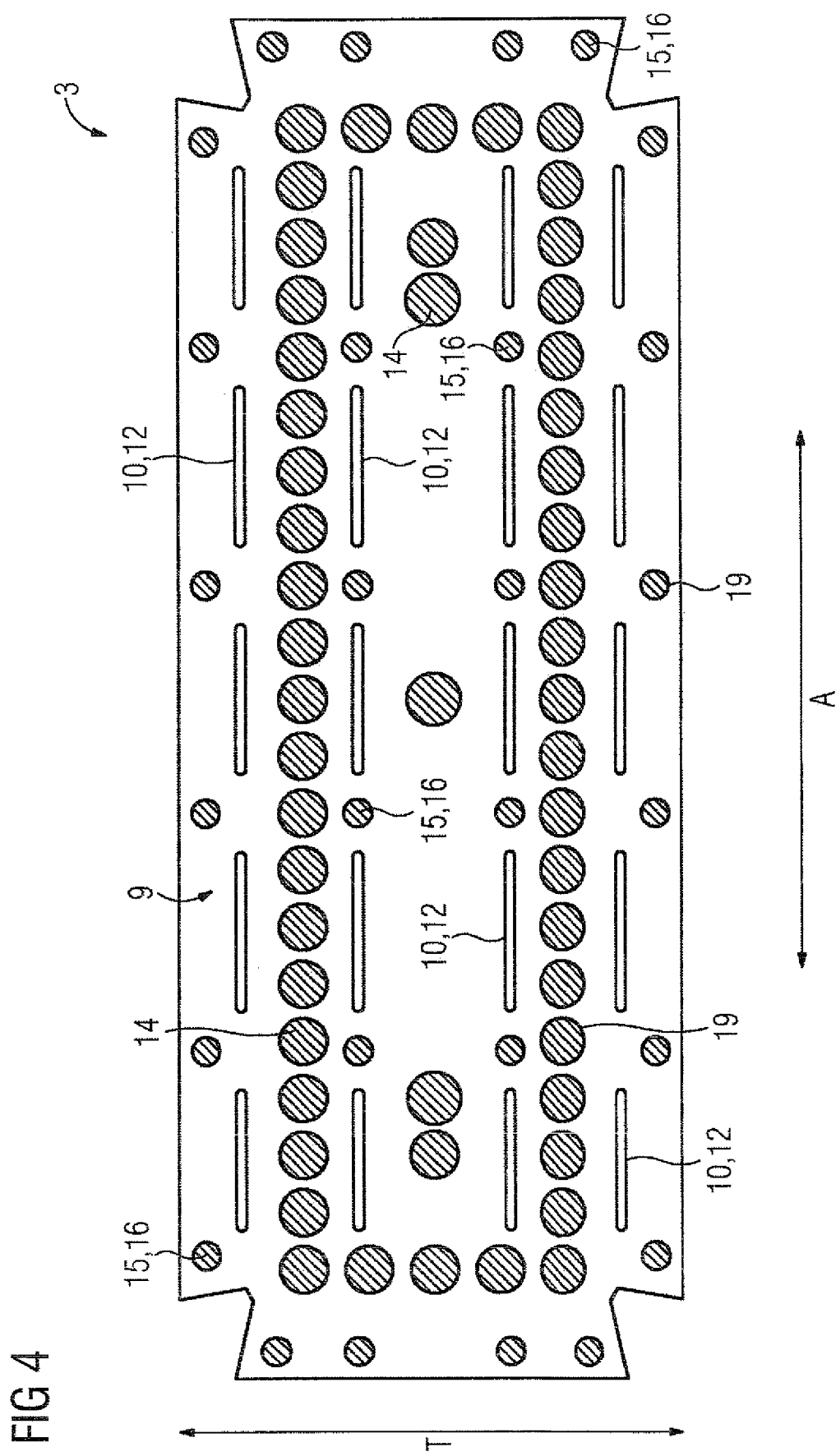
FIG. 4 shows a plan view of a second embodiment of a pole shoe metal sheet.

FIG. 4 shows a plan view of a second embodiment of a pole shoe metal sheet 9. As in FIG. 3, the pole shoe metal sheet 9 has a profiling 10 in the form of slits 12. The slits, which are configured straight, extend in the axial direction A and are arranged between the connection points 15. As a result of such an arrangement of the slits 12, the pole shoe metal sheet 9 is more easily deformable between the connection points 15, in particular in the axial direction A and the tangential direction T. The further configuration of the pole shoe metal sheet 9 corresponds to that of FIG. 3.

Figure 5:
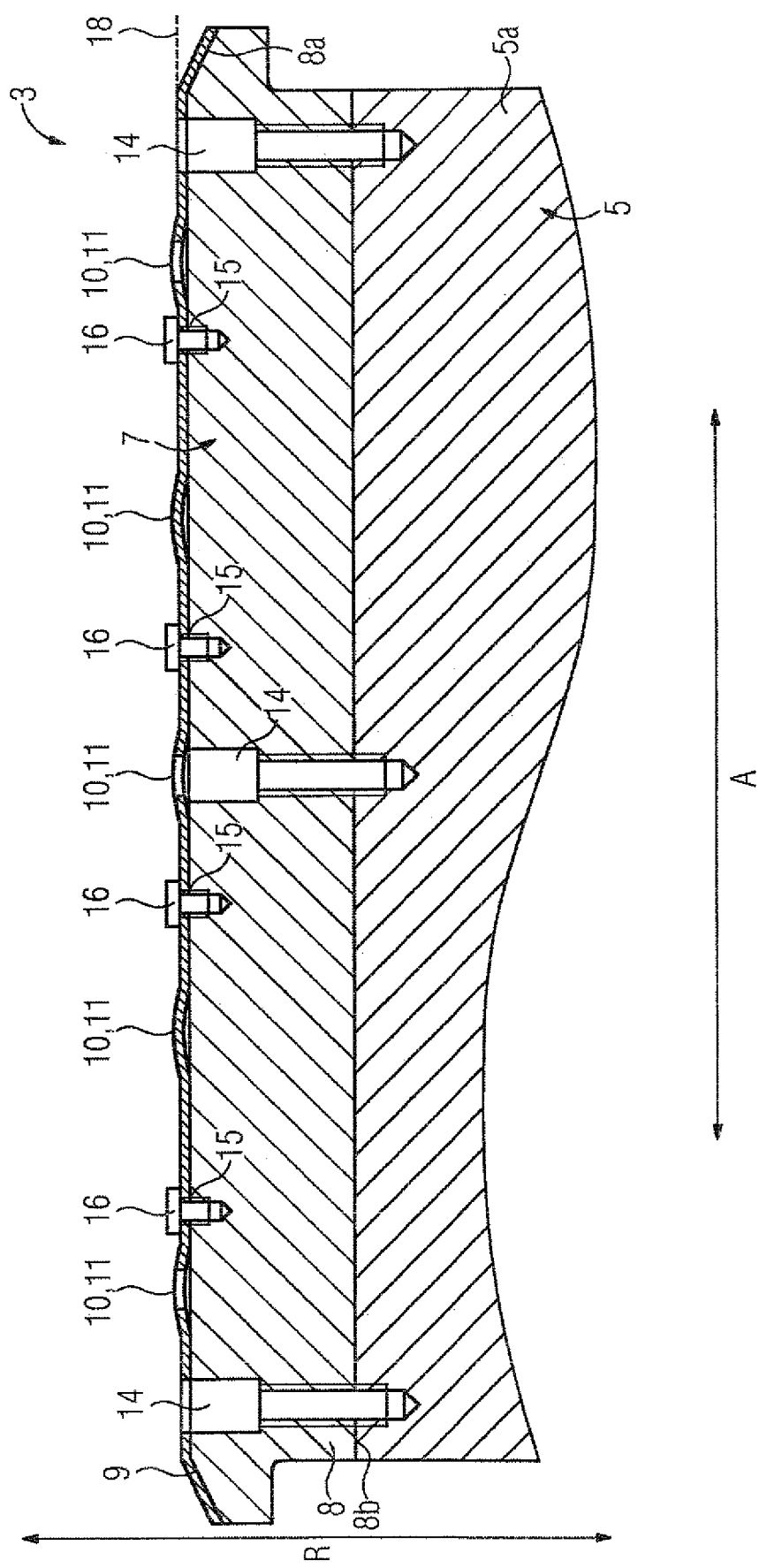
FIG. 5 shows an enlarged longitudinal section of a rotor in the region of a pole shoe with a third embodiment of a pole shoe metal sheet.

FIG. 5 shows an enlarged longitudinal section of a rotor 3 in the region of a pole shoe 7 with a third embodiment of a pole shoe metal sheet 9. The pole shoe metal sheet 9 has a profiling 10 which comprises a plurality of curvatures 11. The curvatures 11 are configured, in relation to a reference plane 18, in the radial direction R outwardly, that is, away from the pole shoe 7. Furthermore, the curvatures 11 have a constant or variable height in the tangential direction T.

The height of the curvatures 11, in relation to the reference plane 18, is in the region of 1 mm to 10 mm. By means of such curvatures 11, the pole shoe metal sheet 9 is more easily and more specifically deformable, for example, by means of a heating due to eddy currents, in particular in the axial direction A. The further configuration of the rotor 3 corresponds to that of FIG. 2.

Figure 6:
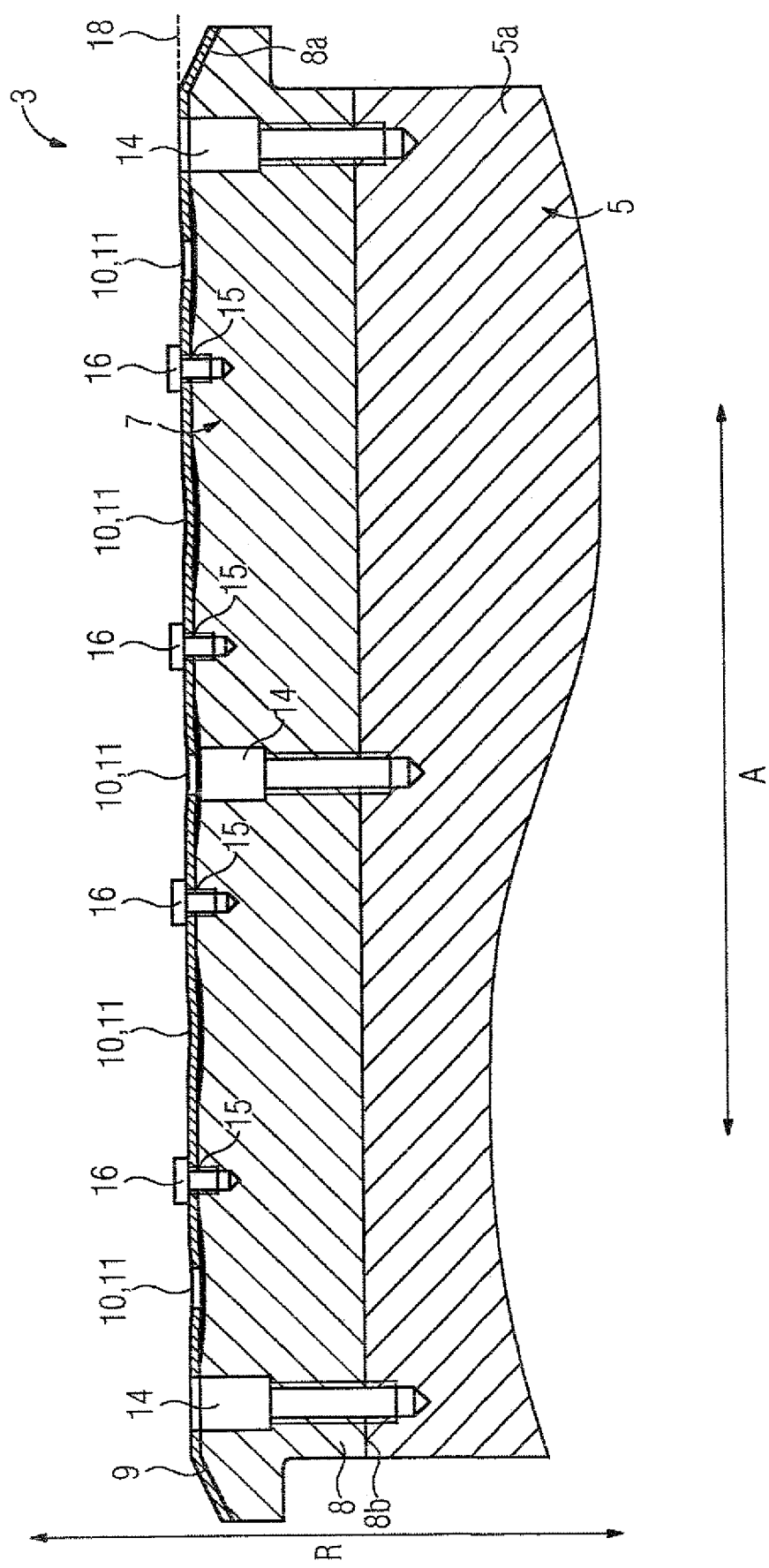
FIG. 6 shows an enlarged longitudinal section of a rotor in the region of a pole shoe with a fourth embodiment of a pole shoe metal sheet.

FIG. 6 shows an enlarged longitudinal section of a rotor 3 in the region of a pole shoe 7 with a fourth embodiment of a pole shoe metal sheet 9. The pole shoe metal sheet 9 has a profiling 10 which comprises, in relation to a reference plane 18, a plurality of curvatures 11 extending inwardly in the radial direction R. In order to enable the realization of radially inwardly extending curvatures 11, the radially outer surface 8a of the pole shoe body 8 has corresponding cut-outs. By means of such radial inwardly extending curvatures 11, the gap 6 is not reduced and no adaptations to the stator 2 and on the rotor 3 have to be carried out. The further configuration of the rotor 3 corresponds to that of FIG. 5.

Figure 7:
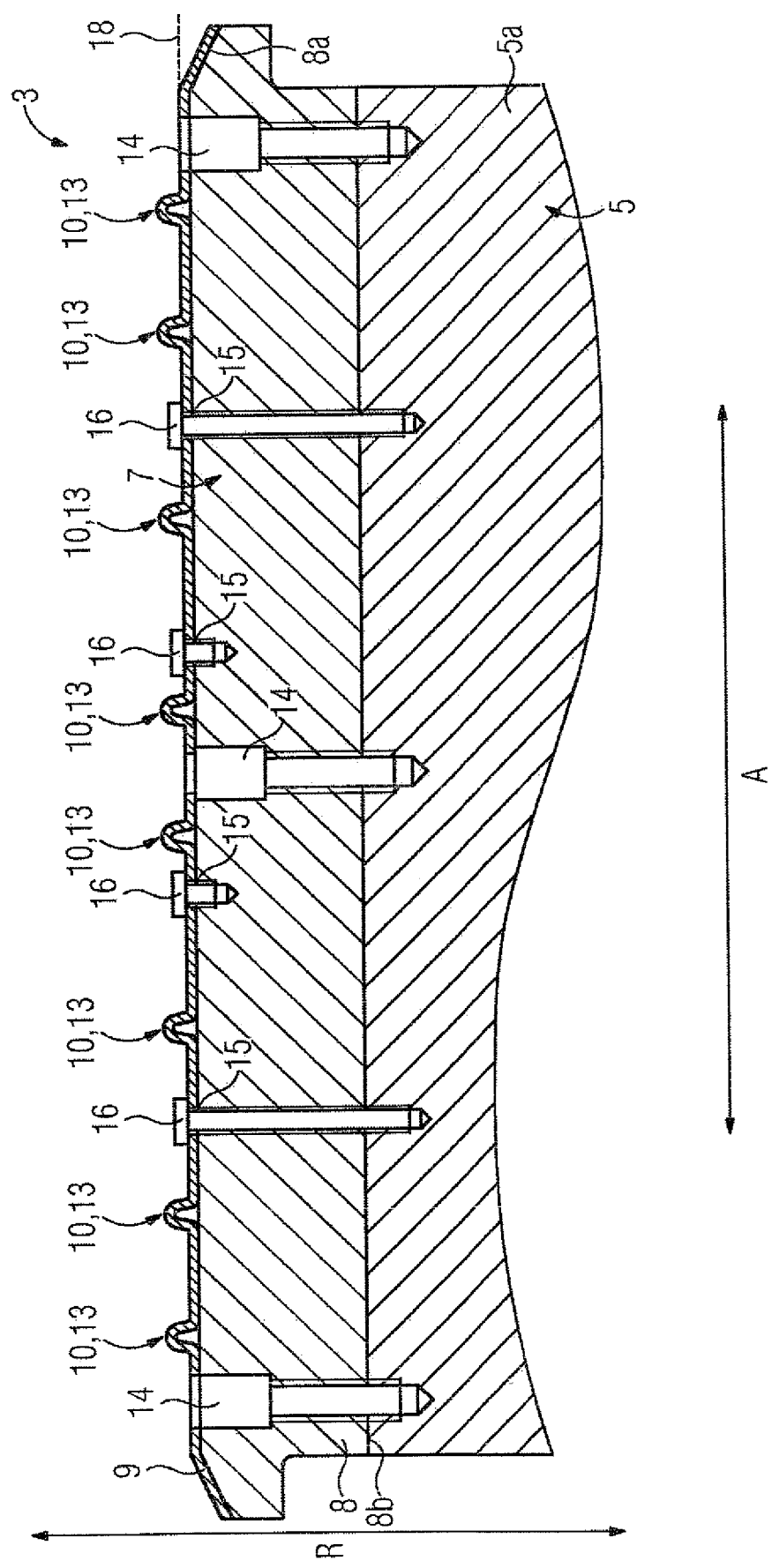
FIG. 7 shows an enlarged longitudinal section of a rotor in the region of a pole shoe with a fifth embodiment of a pole shoe metal sheet.

FIG. 7 shows an enlarged longitudinal section of a rotor 3 in the region of a pole shoe 7 with a fifth embodiment of a pole shoe metal sheet 9. The pole shoe metal sheet 9 has a profiling 10 which comprises a plurality of grooves 13. The grooves 13 are configured, in relation to a reference plane 18, in the radial direction R outwardly, that is, away from the pole shoe 7. The grooves 13 have a constant or variable height in the tangential direction T. The height of the grooves 13, in relation to the reference plane 18, is in the region of 5 mm to 25 mm. By means of such grooves 13, the pole shoe metal sheet 9 is more easily and more specifically deformable, for example, by means of a heating due to eddy currents, in particular in the axial direction A. The pole shoe metal sheet 9 has additional connecting elements 16 which connect the pole shoe metal sheet 8 through the pole shoe body 8 directly to the pole shank 5a. The further configuration of the rotor 3 corresponds to that of FIG. 2.

Figure 8:
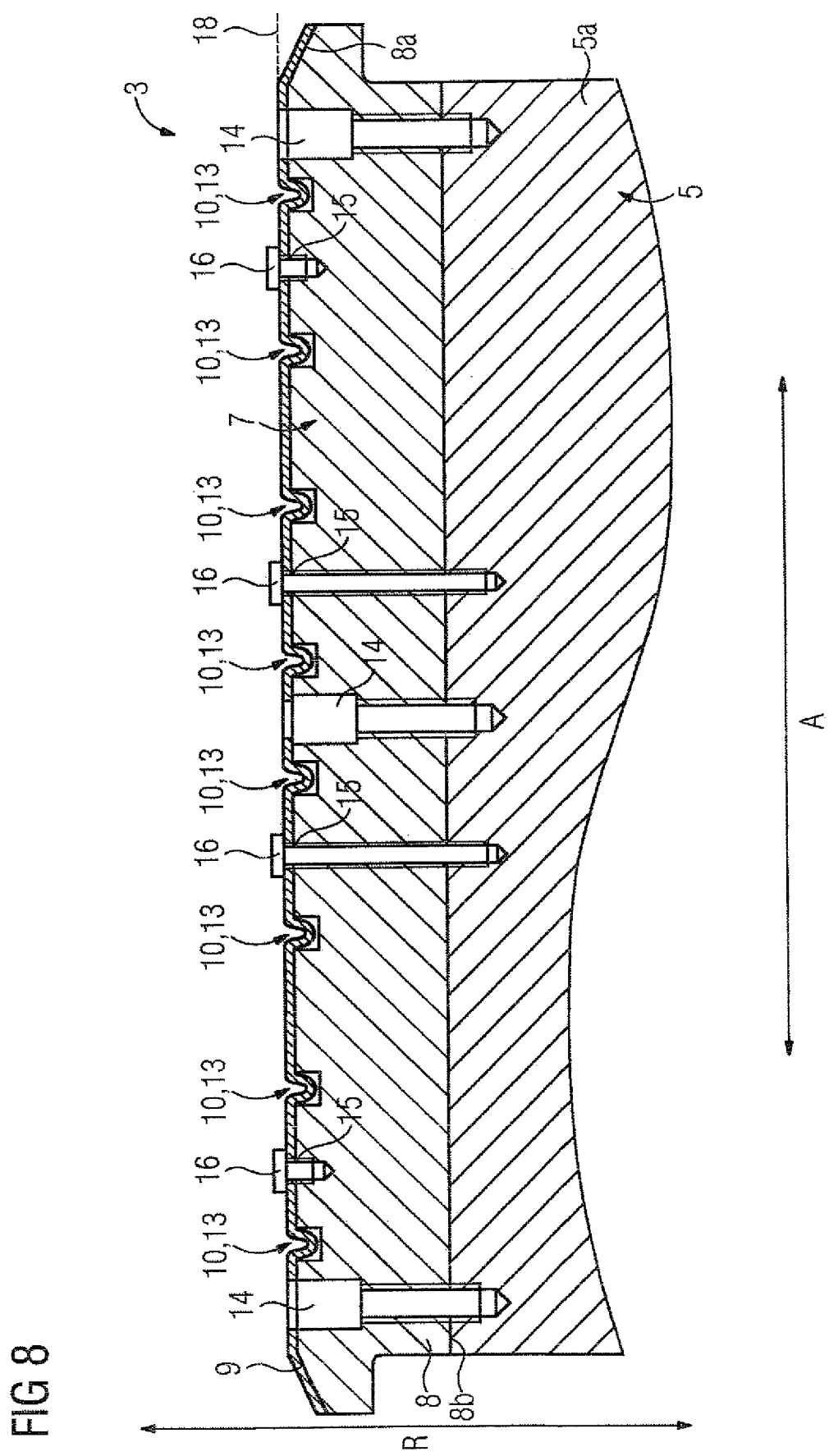
FIG. 8 shows an enlarged longitudinal section of a rotor in the region of a pole shoe with a sixth embodiment of a pole shoe metal sheet.

FIG. 8 shows an enlarged longitudinal section of a rotor 3 in the region of a pole shoe 7 with a sixth embodiment of a pole shoe metal sheet 9. The pole shoe metal sheet 9 has a profiling 10 which comprises, in relation to a reference plane 18, a plurality of grooves 13 extending inwardly in the radial direction R. In order to enable the realization of inwardly extending grooves 13, the radially outer surface 8a of the pole shoe body 8 has corresponding cut-outs. The gap 6 is not reduced by such radial inwardly extending grooves 13. The further configuration of the rotor 3 corresponds to that of FIG. 7.

Figure 9:
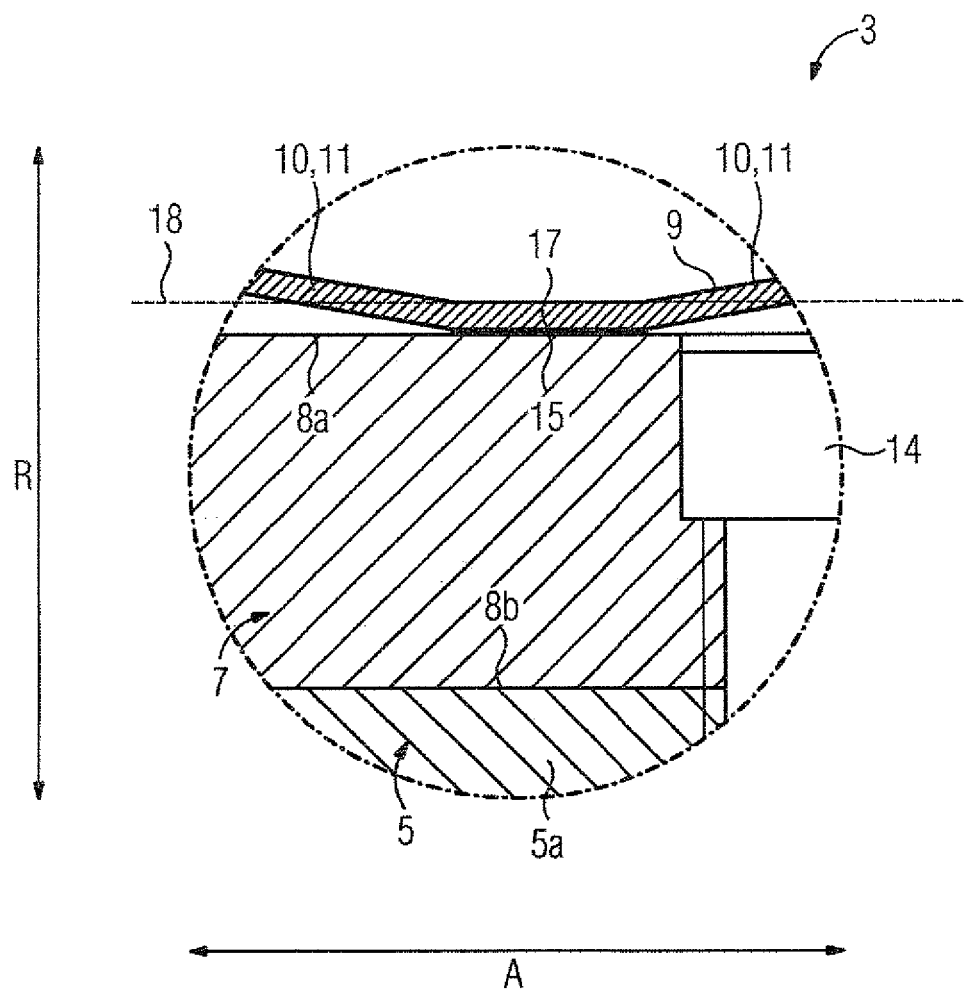
FIG. 9 shows an enlarged portion of a rotor in the region of a fastening point with a seventh embodiment of a pole shoe metal sheet.

FIG. 9 shows an enlarged portion of a rotor 3 in the region of a fastening point 15 with a seventh embodiment of a pole shoe metal sheet 9. The pole shoe metal sheet 9 has a profiling 10 which comprises a plurality of curvatures 11. The pole shoe metal sheet 9 is connected at a connection point 15 between the curvatures 11, by means of a firmly bonded connection 17, to the radially outer surface 8a of the pole shoe body 8. The firmly bonded connection 17 is configured as a weld connection.

What is claimed is:

1. A rotor for an electric rotating machine, such as a synchronous machine, said rotor comprising:
    a shaft mounted for rotation about a rotation axis; and
    a pole shoe connected to the shaft, said pole shoe including a pole shoe body and a pole shoe metal sheet, said pole shoe metal sheet lying on a radially outer surface of the pole shoe body and connected at a plurality of connection points to the pole shoe body, said pole shoe metal sheet having curvatures and/or grooves so as to be configured flexible between the connection points at least in an axial direction.

2. The rotor of claim 1, further comprising connecting elements and/or a bonded connection for connecting the pole shoe metal sheet at the plurality of connection points to the pole shoe body.

3. The rotor of claim 1, wherein the pole shoe metal sheet has a profiling.

4. The rotor of claim 3, wherein the profiling has at least one section which is configured curved.

5. The rotor of claim 3, wherein the profiling has slits and/or holes, said slits extend at least in the axial direction.

6. The rotor of claim 1, wherein the pole shoe metal sheet is formed from a soft magnetic material.

7. The rotor of claim 1, wherein the pole shoe metal sheet has a thickness in a range of 1 mm to 10 mm.

8. The rotor of claim 1, wherein a hollow space is formed in at least one section between the radially outer surface of the pole shoe body and the pole shoe metal sheet.

9. A rotor for an electric rotating machine, such as a synchronous machine, said rotor comprising:
    a shaft mounted for rotation about a rotation axis; and
    a pole shoe connected to the shaft, said pole shoe including a pole shoe body and a pole shoe metal sheet, said pole shoe metal sheet lying on a radially outer surface of the pole shoe body and comprising at least two layered individual metal sheets.

10. The rotor of claim 9, further comprising connecting elements and/or a bonded connection for connecting the pole shoe metal sheet at a plurality of connection points to the pole shoe body.

11. The rotor of claim 9, wherein the pole shoe metal sheet has a profiling.

12. The rotor of claim 11, wherein the profiling has at least one area which is configured curved.

13. The rotor of claim 11, wherein the profiling has slits and/or holes, said slits extend at least in an axial direction.

14. The rotor of claim 9, wherein the pole shoe metal sheet lies full-surface on the radially outer surface of the pole shoe body.

15. The rotor of claim 9, wherein the pole shoe metal sheet is formed from a soft magnetic material.

16. The rotor of claim 9, wherein the pole shoe metal sheet has a thickness in a range of 1 mm to 10 mm.

17. The rotor of claim 9, wherein a hollow space is formed in at least one section between the radially outer surface of the pole shoe body and the pole shoe metal sheet.

18. An electric rotating machine, such as a synchronous machine, said electric rotating machine comprising a rotor which includes a shaft mounted for rotation about a rotation axis, and a pole shoe including a pole shoe body and a pole shoe metal sheet, said pole shoe metal sheet lying on a radially outer surface of the pole shoe body and connected at a plurality of connection points to the pole shoe body, said pole shoe metal sheet having curvatures and/or grooves so as to be configured flexible between the connection points at least in an axial direction.

19. An electric rotating machine, such as a synchronous machine, said electric rotating machine comprising a rotor which includes a shaft mounted for rotation about a rotation axis, and a pole shoe including a pole shoe body and a pole shoe metal sheet, said pole shoe metal sheet lying on a radially outer surface of the pole shoe body and comprising at least two layered individual metal sheets.

20. A method for manufacturing a rotor, said method comprising:
    forming a pole shoe metal sheet with curvatures and/or grooves to impart flexibility;
    placing the pole shoe metal sheet on a radially outer surface of a pole shoe body;
    connecting the pole shoe metal sheet at a plurality of connection points to the pole shoe body to form a pole shoe, such that the curvatures and/or grooves extend between the connection points; and
    connecting the pole shoe to a shaft mounted for rotation about a rotation axis.

21. A method for manufacturing a rotor, said method comprising:
- forming a pole shoe metal sheet by placing at least two layered individual metal sheets in superimposed relation to impart flexibility;
- placing the pole shoe metal sheet on a radially outer surface of a pole shoe body to form a pole shoe; and
- connecting the pole shoe to a shaft mounted for rotation about a rotation axis.

* * * * *